United States Patent [19]

Drescher

[11] Patent Number: 4,583,886

[45] Date of Patent: Apr. 22, 1986

[54] CUTTING INSERT CLAMPING ASSEMBLY FOR CUTTING TOOL

[76] Inventor: Albert A. Drescher, 301 E. Gunn, Rochester, Mich. 48063

[21] Appl. No.: 485,270

[22] Filed: Apr. 15, 1983

Related U.S. Application Data

[63] Continuation-in-part of Ser. No. 296,639, Aug. 27, 1981, abandoned.

[51] Int. Cl.[4] ............... B26D 3/00; B23B 29/04; B23C 5/22
[52] U.S. Cl. ............................. 407/40; 407/48; 407/89; 407/104
[58] Field of Search ............... 407/40, 103, 104, 99, 407/48, 81, 83, 89

[56] References Cited

U.S. PATENT DOCUMENTS

| | | | |
|---|---|---|---|
| 3,125,798 | 3/1964 | Stein | 407/83 |
| 3,176,377 | 4/1965 | Milewski | 407/103 |
| 3,188,717 | 6/1965 | Heinlein | 407/40 |
| 3,405,433 | 10/1968 | Williams | 407/40 |
| 3,520,042 | 7/1970 | Stier | 407/103 |
| 3,611,527 | 10/1971 | Hudson | 407/104 |
| 3,656,220 | 4/1972 | Dupuis | 407/104 |
| 4,040,156 | 8/1977 | Tack | 29/96 |
| 4,195,955 | 4/1980 | Lindsay | 407/40 |
| 4,202,650 | 5/1980 | Erickson | 407/46 |

Primary Examiner—Francis S. Husar
Assistant Examiner—William E. Terrell

[57] ABSTRACT

A cutting tool comprising a holder and a removable indexable cutting insert clampingly held on the holder. The holder has a cut-out portion having a concave surface and an insert support and clamping block having a conforming convex surface corresponding to the concave surface of the holder cut-out portion movably held relatively therewith by a differential screw. The insert support and clamping block has a surface supporting the insert and a pin projecting through a mounting aperture in the insert. The cut-out portion has sidewall surfaces engaged by corresponding lateral faces of the insert when the block is driven by action on the differential screw into an insert clamping position. The block has a projecting tang or flange disposed in a corresponding groove in the surface of the cut-out portion, the tang or flange and groove combination acting as a pilot and locator for the insert support and clamping block and as a means of transmitting cutting forces applied upon the cutting insert to the holder.

34 Claims, 14 Drawing Figures

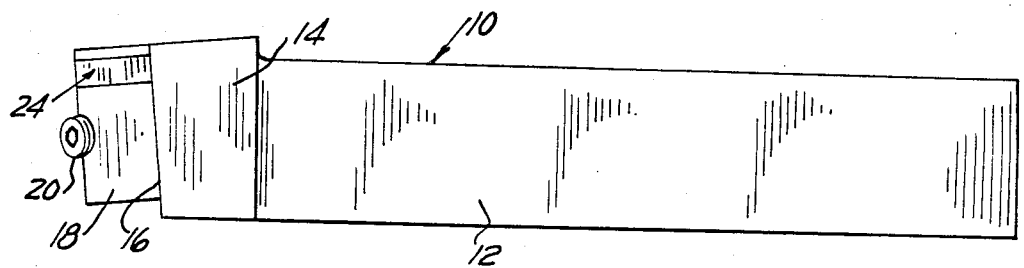
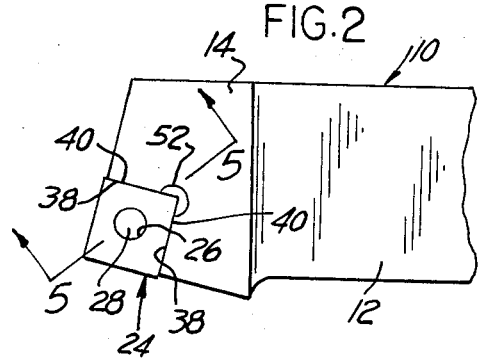
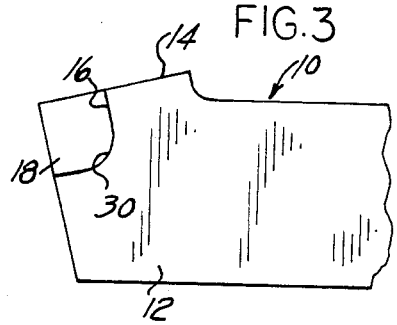
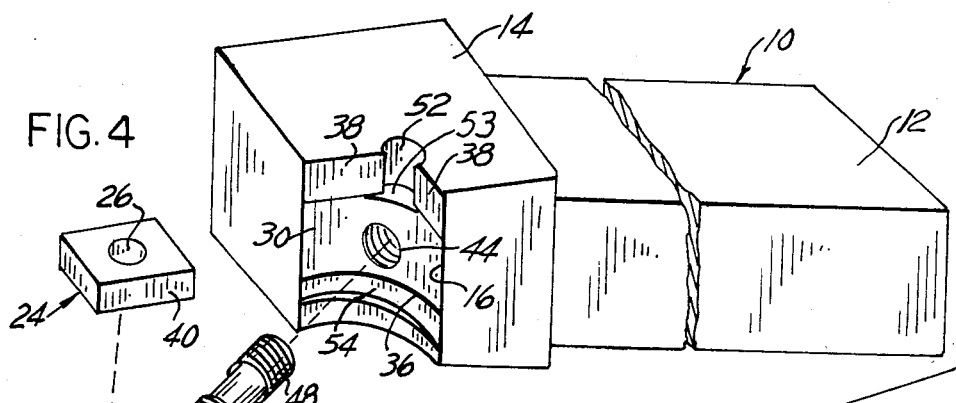
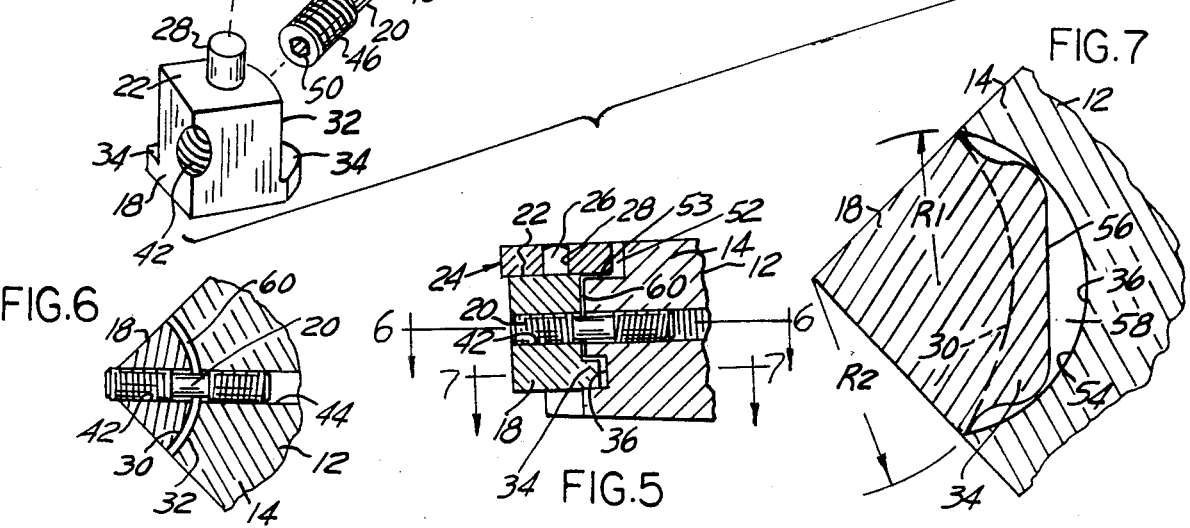

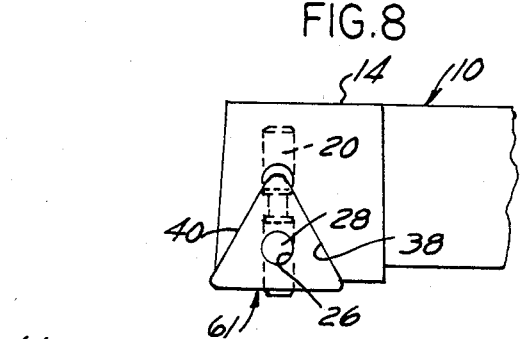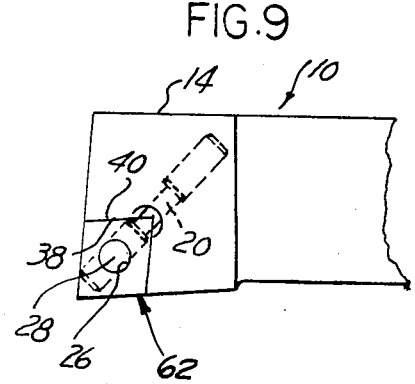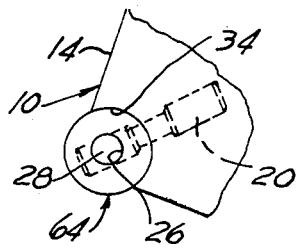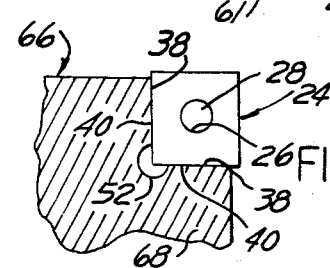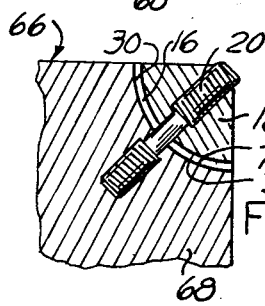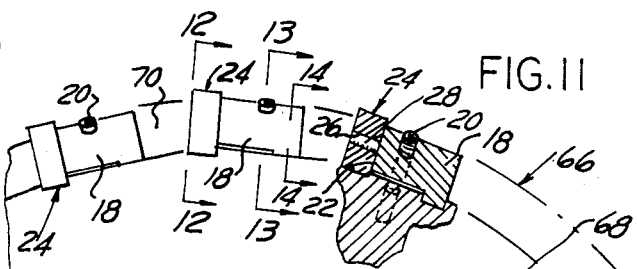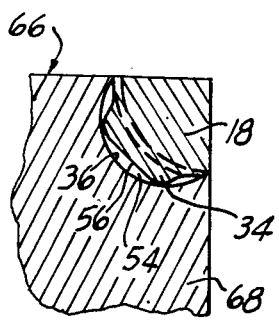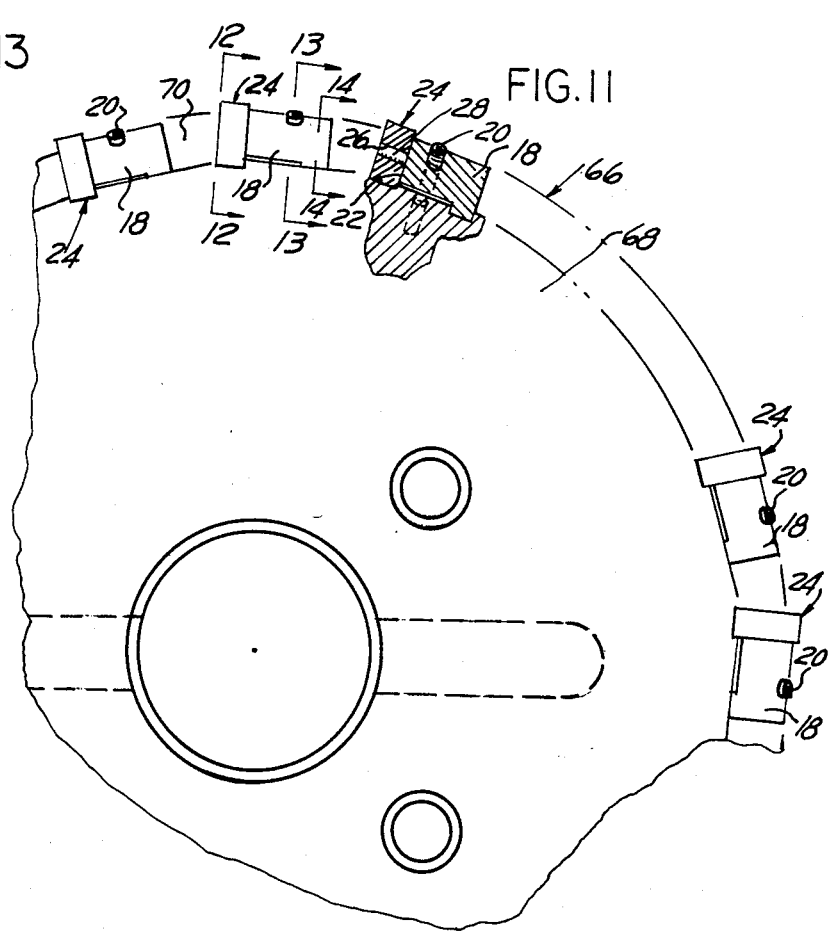

CUTTING INSERT CLAMPING ASSEMBLY FOR CUTTING TOOL

CROSS-REFERENCE TO RELATED APPLICATION

The present application is a continuation-in-part of application Ser. No. 296,639, filed Aug. 27, 1981 abandoned for Tool Clamping Assembly.

BACKGROUND OF THE INVENTION

The present invention relates to cutting tools and more particularly to a cutting tool provided with a removable indexable cutting insert.

It is known in the art of cutting tools for effecting cutting operations such as milling, turning, boring, broaching and the like, to provide a holder with a cutting insert which is either fixedly secured to the tool holder by brazing, or which is removably mounted in a cutting position on the tool holder by a mechanical fastening mechanism.

Diverse mechanical attachment devices have been provided in the past for removably mounting interchangeable throw-away cutting inserts, made of a metallic carbide or ceramic, for example, on a holder. Such devices may be in the form of a clamp, an eccentric pin or a screw passed through a mounting aperture in the insert. Clamps are arranged to hold the insert in a pocket formed in the holder, by applying vertically directed clamping force urging the bottom surface of the insert in engagement with the bottom of a pocket formed in the tool holder, with one, or more, edge or side surface of the insert in engagement with one, or more, sidewall of the pocket. Clamping pins rely principally on wedging engagement or frictional engagement between two consecutive side surfaces of the insert and corresponding consecutive sidewalls of the tool holder pocket, with the resultant of the forces acting on the cutting insert during a cutting operation being relied upon for applying the bottom face of the insert in engagement with the bottom of the pocket.

Most of the cutting insert clamping mechanisms or wedging mechanisms of the prior art are only effective to a certain degree, some comprise many parts requiring many machining operations to be effected on the tool holder, and many fall short of providing positive locking of a cutting insert to a tool holder, while permitting easy removal of the insert for indexing a fresh cutting edge, or for replacing a worn cutting insert by a new one.

SUMMARY OF THE INVENTION

The present invention provides a tool holder-cutting insert assembly permitting to overcome some of the shortcomings of the prior art by means of a holding and clamping mechanism requiring a small turn of a tool, such as an Allen or hex wrench, for clamping a cutting insert on the tool holder and for freeing the cutting insert from the tool holder for indexing, regrinding, or for replacement. The present invention provides a strong support for the cutting insert aand repetitive positioning of the insert in clamped position, thus doing away with repeated tool set-up or adjustment when an indexable cutting insert is indexed to a fresh cutting edge or replaced by a new cutting insert.

The many objects and advantages of the present invention will become apparent to those skilled in the art when the following description of the best modes contemplated for practicing the invention is read in conjunction with the accompanying drawing wherein like numerals refer to like or equivalent elements.

BRIEF DESCRIPTION OF THE DRAWING

FIG. 1 is a side elevation view of an example of a cutting tool according to the present invention, for use for turning of a workpiece on a lathe;
FIG. 2 is a top plan view of a portion thereof;
FIG. 3 is a bottom plan view of a portion thereof;
FIG. 4 is a perspective exploded view thereof;
FIG. 5 is a sectional view along line 5—5 of FIG. 2;
FIG. 6 is a sectional view along line 6—6 of FIG. 5;
FIG. 7 is a sectional view along line 7—7 of FIG. 5;
FIGS. 8–10 are views similar to FIG. 2 but showing different cutting tool configurations;
FIG. 11 is an example of a rotary cutting tool, such as a facing milling tool, incorporating the insert clamping mechanism of the present invention; and
FIGS. 12, 13 and 14 are sections respectively on line 12—12, line 13—13 and line 14—14 of FIG. 11.

DETAILED DESCRIPTION OF THE PREFERRED EMBODIMENTS

Referring to the drawing, and more particularly to FIGS. 1-4, a cutting tool 10 according to the present invention and adapted, for example, to be mounted by appropriate clamping means in the tool holder of a machine lathe, not shown, takes the form of an elongated parallelepipedonal bar or shank 12, for example made of steel, having an integral enlarged head 14 provided with a cut-out portion 16 at one corner. A removable cutter support and clamping block 18 is mounted in the space provided by the cut-out portion 16 by way of an elongated differential screw 20. The top of the support and clamping block 18, as best shown at FIGS. 4 and 5, has a flat surface 22 supporting a cutting insert 24, in the form of a block or plate of extra hard material, such as a metallic carbide, having a centrally disposed mounting aperture 26 fitting over an integral pin 28 projecting from the surface 22 of the support and clamping block 18.

As best shown at FIGS. 3, 5 and 6, the cut-out portion 16 in the holder head 14 has a generally concave cylindrical wall surface 30, and the support and clamping block 18 has a conforming convex cylindrical surface 32. A projecting tang or flange 34 is formed at the bottom of the support and clamping block 18 for engagement in a groove 36 formed in the concave cylindrical surface of the cut-out portion 16. A pair of converging flat sidewall surfaces 38 are formed in the cut-out portion 16 at the top thereof for engagement with two consecutive lateral surfaces 40 of the cutting insert 24, projecting beyond the perimeter of the block support surface 22, such as to provide longitudinal and lateral support for the cutting insert 24 in clamped position.

The support and clamping block 18 is provided with a longitudinal threaded bore 42 aligned with a threaded bore 44 in the holder head 14, the threaded bores 42 and 44 being disposed substantially along a radius of the cut-out portion cylindrical surface 30. The threads of the bores 42 and 44 are in opposite direction, for example the thread in the bore 42 in the support and clamping block 18 being left-handed such as to correspond to a left-handed threaded end portion 46 of the differential screw 20, while the thread in the bore 44 in the tool holder head 14 is right-handed such as to correspond to the right-handed thread of the threaded end portion 48 of the differential screw 20. Consequently, with the threaded end portion 48 of the differential screw 20 engaged in the threaded bore 44 and the threaded end 46 of the differential screw 20 engaged in the threaded bore 42, clock-wire driving of the differential screw 20 by means of a conventional hex wrench of the appropriate size fitted in the socket 50 of the differential screw 20 drives the support and clamping block 18 into the cut-out portion 16 until a pair of consecutive side surfaces 40 of the cutting insert 24 abuts against the sidewalls 38 in the tool holder head 14, to the position illustrated at FIGS. 2 and 5, thus clamping the cutting insert 24, simultaneously causing the projecting tang or flange 34 of the insert support and clamping block 18 to engage within the groove 36 in the cut-out portion 16 of the holder head 14.

With the cutting insert 24 solidly clamped in position, supported by the top surface 22 of the support and clamping block 18, the clamping force causing two consecutive lateral surfaces 40 of the cutting insert 24 to be firmly engaged against the sidewalls 38 is taken through the pin 28 engaged in the mounting aperture 26 of the cutting insert 24. When the cutting tool 10 is in operation, the rearwardly directed resultant of the cutting forces further urge the cutting insert 24 in the direction that increases the clamping force firmly applying two consecutive lateral faces 40 of the insert 24 in engagement with the cut-out portion flat sidewalls 38. The vertically directed resultant of the cutting forces is taken mostly by the tang or flange 34 being forced downwardly within the groove 36.

A recess 52, FIGS. 2, 4 and 5 is disposed at the converging ends of the sidewall surfaces 38 in the head cut-out portion 16 to provide adequate clearance around the corner of two consecutive lateral faces 40 of the cutting insert 24, such as to permit the cutting insert lateral faces 40 to seat properly on the sidewall surfaces 38 during clamping, any dirt pushed by the insert corner being caused to collect in the recess 52. The lower face of the cutting insert 24 at its corner projecting into the recess 52 is clear of a small ledge 53, FIGS. 4 and 5.

The groove 36 at the bottom of the concave cylindrical surface 30 of the head cut-out portion 16 is preferably formed with a bottom cylindrical surface 54, FIG. 7, of a radius $R_1$ slightly shorter than the radius $R_2$ of the support and clamping block cylindrical surface 32 and of the cut-out portion cylindrical surface 30. The tang or flange 34 of the support and clamping block 18 has preferably a substantially straight leading edge 56 such as to leave a space 58 between the leading edge 56 of the ledge or flange 34 and the bottom surface 54 of the groove 58. The space 58 acts as a dirt collector, when the clamping block 18 is displaced within the head cut-out portion 16, with the tang or flange 34 projecting within the groove 36.

It will be appreciated that the respective dimensions of the cut-out portion 16 and of the support and clamping block 18, and of the cutting insert 24, are such that when the cutting insert 24 is rigidly clamped in position, a narrow clearance space as shown at 60 at FIG. 5 exists between the cylindrical surfaces 32 and 30 of, respectively, the support and clamping block 18 and the cut-out portion 16, so as to permit the conssective side faces 40 of the cutting insert 24 to firmly engage the sidewall flat surfaces 38, without interference. The tang or flange 34 of the insert support and clamping block 18 engaged in the groove 36 in the head cut-out portion 16 acts as a pilot means and serves the double purpose of properly locating and orienting the support surface 22 of the block 18 and consequently the insert 24 according to a predetermined plane, and to absorb and transmit to the holder head 14 the vertical load imposed upon the cutting insert 24 in the course of a cutting operation, as previously mentioned, through engagement of the lower surface of the ledge or flange 34 with the lower surface of the groove 36.

It will be appreciated by those skilled in the art that the surfaces 30 of the holder head cut-out portion and 32 of the support and clamping block 18 may have contours other than cylindrical and that although the cutting tool provided with the insert holding and clamping mechanism of the invention has been illustrated with reference to FIGS. 1–7 in combination with a square cutting insert 24, it will be readily appreciated by those skilled in the art that the same principles are applicable to holders for supporting cutting inserts of any conventional shape, such as the triangular cutting insert 61 illustrated at FIG. 8, the parallelogram-shaped cutting insert 62 illustrated at FIG. 9 and the circular button cutting insert 64 illustrated at FIG. 10. The same principles are also applicable for mounting removable and indexable cutting inserts 24 on any other cutting tool such as the facing milling tool 66 of FIGS. 11–14.

The cutting tool 66 is in the form of a circular plate or disk 68 provided with an annular edge groove 70. A plurality of cutting inserts 24 are clamped in the groove 70. Each cutting insert 24 is clamped in the groove 70 by way of a holding and clamping block 18, each block 18 being provided with an insert support surface 22 from which projects an integral pin 28 disposed in the insert mounting aperture 26. A differential screw 20 permits to displace the block 18 into the peripheral groove 70 for clamping the cutting insert 22 with consecutive side faces 40 of the insert engaged in abutment sidewall surfaces 38 formed in the groove 70, FIG. 12. As illustrated at FIGS. 12–14, the clamping mechanism is in all respects identical to the insert clamping means hereintofore described, and the insert holding and clamping block 18, displaceable by the differential screw 20, is provided with a tang or flange 34 acting as a pilot means and cutting load carrying means in conjunction with a generally circular groove 36 formed in the annular edge groove 70.

Having thus described the present invention by way of examples of structures well designed for practicing the teachings of the invention, modifications whereof will be apparent to those skilled in the art, what is claimed as new is as follows:

1. A cutting tool comprising a removable indexable cutting insert provided with a mounting aperture, a holder having a cut-out portion, a cutting insert support and clamping block having a surface supporting said cutting insert and an integral pin projecting from said supporting surface through said cutting insert mounting aperture, at last a pair of lateral faces of said cutting insert projecting beyond the insert supporting surface of said block, a pair of sidewall surfaces on said cut-out portion for engagement with said projecting lateral faces of said cutting insert, means for adjustably displacing said block in said cut-out portion in a direction engaging said cutting insert lateral faces with said sidewall surfaces on said cut-out portion, and means for locating said block within said holder cut-out portion and for transmitting to said holder forces applied upon said cutting insert in the course of a cutting operation effected by said cutting tool, wherein said means for displacing said block comprises a differential screw having a threaded end engaged in a threaded bore in said block and another threaded end of opposite thread engaged in a correspondingly threaded bore in said holder extending to said cut-out portion, said threaded bore in said holder being aligned with said threaded bore in said block, and wherein said means for locating said block and for transmitting to said holder forces applied upon said cutting insert in the course of a cutting operation consists of an integral tang projecting from said block and a corresponding groove in said cut-out portion adapted to receive said projecting tang, whereby a surface of said tang engages a sidewall of said groove for transmitting to said holder the forces applied upon said cutting insert in the course of a cutting operation effected by said cutting tool, and wherein said groove in said cut-out portion has a bottom surface forming a cylindrical surface of predetermined radius and said cutting insert support and clamping block has a cylindrical surface from which said tang projects, the cylindrical surface of said block having a radius larger than said predetermined radius.

2. The cutting tool of claim 1 wherein said cut-out portion has a concave generally cylindrical surface and said block has a conforming convex generally cylindrical surface.

3. The cutting tool of claim 1 wherein said cutting insert has a square perimeter.

4. The cutting tool of claim 3 wherein said holder is a bar and said cut-out portion is formed at an end of said bar.

5. The cutting tool of claim 3 wherein said holder is a circular plate and said cut-out portion is an annular groove formed at an edge of said circular plate.

6. The cutting tool of claim 1 wherein said cutting insert has a triangular perimeter.

7. The cutting tool of claim 6 wherein said holder is a bar and said cut-out portion is formed at an end of said bar.

8. The cutting tool of claim 6 wherein said holder is a circular plate and said cut-out portion is an annular groove formed at an edge of said circular plate.

9. The cutting tool of claim 1 wherein said cutting insert has a parallelogram shaped perimeter.

10. The cutting tool of claim 9 wherein said holder is a bar and said cut-out portion is formed at an end of said bar.

11. The cutting tool of claim 9 wherein said holder is a circular plate and said cut-out portion is an annular groove formed at an edge of said circular plate.

12. The cutting tool of claim 1 wherein said holder is a bar and said cut-out portion is formed at an end of said bar.

13. The cutting tool of claim 1 wherein said holder is a circular plate and said cut-out portion is an annular groove formed at an edge of said circular plate.

14. The cutting tool of claim 1 wherein said tang has a substantially straight leading edge.

15. A cutting tool comprising a removable indexable cutting insert provided with a mounting aperture, a holder having a cut-out portion, a cutting insert support and clamping block having a surface supporting said cutting insert and an integral pin projecting from said supporting surface through said cutting insert mounting aperture, at least a pair of lateral faces of said cutting insert projecting beyond the insert supporting surface of said block, a pair of sidewall surfaces on said cut-out portion for engagement with said projecting lateral faces of said cutting insert, means for adjustably displacing said block in said cut-out portion in a direction engaging said cutting insert lateral faces with said sidewall surfaces on said cut-out portion, and means for locating said block within said holder cut-out portion and for transmitting to said holder forces applied upon said cutting insert in the course of a cutting operation effected by said cutting tool, wherein said means for displacing said block comprises a differential screw having a threaded end engaged in a threaded bore in said block and another threaded end of opposite thread engaged in a correspondingly threaded bore in said holder extending to said cut-out portion, said threaded bore in said holder being aligned with said threaded bore in said block, and wherein said means for locating said block and for transmitting to said holder forces applied upon said cutting insert in the course of a cutting operation consists of an integral tang projecting from said block and a corresponding groove in said cut-out portion adapted to receive said projecting tang, whereby a surface of said tang engages a sidewall of said groove for transmitting to said holder the forces applied upon said cutting insert in the course of a cutting operation effected by said cutting tool, and wherein said cut-out portion has a concave surface of generally cylindrical shape and said block has a conforming convex surface of generally cylindrical shape.

16. The cutting tool of claim 15 wherein said cutting insert has a square perimeter.

17. The cutting tool of claim 16 wherein said holder is a bar and said cut-out portion is formed at an end of said bar.

18. The cutting tool of claim 16 wherein said holder is a circular plate and said cut-out portion is an annular groove formed at an edge of said circular plate.

19. The cutting tool of claim 16 wherein said holder is a circular plate and said cut-out portion is an annular groove formed at an edge of said circular plate.

20. The cutting tool of claim 15 wherein said cutting insert has a triangular perimeter.

21. The cutting tool of claim 20 wherein said holder is a bar and said cut-out portion is formed at an end of said bar.

22. The cutting tool of claim 15 wherein said cutting insert has a parallelogram shape perimeter.

23. The cutting tool of claim 22 wherein said holder is a bar and said cut-out portion is formed at an end of said bar.

24. The cutting tool of claim 22 wherein said holder is a circular plate and said cut-out portion is an annular groove formed at an edge of said circular plate.

25. The cutting tool of claim 15 wherein said holder is a bar and said cut-out portion is formed at an end of said bar.

26. The cutting tool of claim 15 wherein said holder is a circular plate and said cut-out portion is an annular groove formed at an edge of said circular plate.

27. A cutting tool comprising a removable cutting insert provided with a mounting aperture, said cutting insert having a circular peripheral face, a holder having a cut-out portion, a cutting insert support and clamping block having a surface supporting said cutting insert and an integral pin projecting from said supporting surface through said cutting insert mounting aperture, at least a portion of said cutting insert circular peripheral face projecting beyond the insert supporting surface of said block, a corresponding partially circular sidewall surface on said cut-out portion for engagement with a portion of said projecting circular peripheral face of said cutting insert, means for adjustably displacing said block in said cut-out portion, and means for locating said block within said holder cut-out portion and for transmitting to said holder forces applied upon said cutting insert in the course of a cutting operation effected by said cutting tool, wherein said means for displacing said block comprises a differential screw having a threaded end engaged in a threaded bore in said block and another threaded end of opposite thread engaged in a correspondingly threaded bore in said holder extending to said cut-out portion, said threaded bore in said holder being aligned with said threaded bore in said block, and wherein said means for locating said block and for transmitting to said holder forces applied upon said insert in the course of a cutting operation consists of an integral tang projecting from said block and a corresponding groove in said cut-out portion adapted to receive said projecting tang, said groove in said cut-out portion having a bottom surface forming a cylindrical surface of predetermined radius and said insert support and clamping block having a cylindrical surface from which said tang projects, the cylindrical surface of said block having a radius larger than said predetermined radius, whereby a surface of said tang engages a sidewall of said groove for transmitting to said holder the forces applied upon said cutting insert in the course of a cutting operation effected by said cutting tool, and wherein said cut-out portion has a concave surface of generally cylindrical shape and said block has a conforming convex surface of generally cylindrical shape.

28. The cutting tool of claim 27 wherein said holder is a bar and said cut-out portion is formed at an end of said bar.

29. The cutting tool of claim 28 wherein said groove in said cut-out portion has a bottom surface forming a cylindrical surface of predetermined radius and said cutting insert support and clamping block has a cylindrical surface from which said tang projects, the cylindrical surface of said block having a radius larger than said predetermined radius.

30. The cutting tool of claim 29 wherein said tang has a substantially straight leading edge.

31. The cutting tool of claim 27 wherein said holder is a circular plate and said cut-out portion is an annular groove formed at an edge of said circular plate.

32. The cutting tool of claim 31 wherein said groove in said cut-out portion has a bottom surface forming a cylindrical surface of predetermined radius and said cutting insert support and clamping block has a cylindrical surface from which said tang projects, the cylindrical surface of said block having a radius larger than said predetermined radius.

33. The cutting tool of claim 32 wherein said tang has a substantially straight leading edge.

34. The cutting tool of claim 27 wherein said tang has a substantially straight leading edge.

* * * * *

UNITED STATES PATENT AND TRADEMARK OFFICE
CERTIFICATE OF CORRECTION

PATENT NO. : 4,583,886
DATED : April 22, 1986
INVENTOR(S) : Albert A. Drescher

It is certified that error appears in the above-identified patent and that said Letters Patent are hereby corrected as shown below:

On the title page, insert --Attorney, Agent or Firm- Hauke and Patalidis, P.C.--.

Col. 1, line 61 change "aand" to --and--.

Col. 3, line 7, change "clock-wire" to --clock-wise--.

Col. 4, line 59, change "last" to --least--.

Signed and Sealed this

Fourth Day of November, 1986

[SEAL]

Attest:

Attesting Officer

DONALD J. QUIGG

Commissioner of Patents and Trademarks